United States Patent
Wagner et al.

(10) Patent No.: US 7,496,814 B2
(45) Date of Patent: Feb. 24, 2009

(54) LOAD TESTING OF A TELECOMMUNICATION NETWORK

(75) Inventors: Ute Wagner, Falkenrehde (DE); Mike Wiedemann, Falkensee (DE); Christian Schoenfeld, Berlin (DE); Christian Zander, Berlin (DE); Michael Bluemche, Berlin (DE); Heinz-Joachim Laake, Oberkramer Barenklau (DE); Christian Hain, Berlin (DE); Kristian Martens, Berlin (DE); Karsten Kiehlmann, Darnstadt (DE); Elisabeth A. Muncher, Forest Grove, OR (US)

(73) Assignee: Tektronix, Inc., Beaverton, OR (US)

( * ) Notice: Subject to any disclaimer, the term of this patent is extended or adjusted under 35 U.S.C. 154(b) by 326 days.

(21) Appl. No.: 11/349,895

(22) Filed: Feb. 7, 2006

(65) Prior Publication Data

US 2007/0033455 A1 Feb. 8, 2007

(51) Int. Cl.
*G01R 31/28* (2006.01)

(52) U.S. Cl. .......................................... 714/724; 714/27

(58) Field of Classification Search ................. 715/804, 715/736; 714/4, 5, 724, 27; 455/8; 707/101; 14/724

See application file for complete search history.

(56) References Cited

U.S. PATENT DOCUMENTS

| | | | |
|---|---|---|---|
| 6,556,223 B1 * | 4/2003 | Tran et al. .................... | 715/804 |
| 6,714,217 B2 * | 3/2004 | Huang et al. ................. | 715/736 |
| 7,093,156 B1 * | 8/2006 | Shubat et al. .................... | 714/5 |
| 7,171,157 B2 * | 1/2007 | Lee ................................ | 455/8 |
| 7,313,564 B2 * | 12/2007 | Melamed et al. ............ | 707/101 |
| 2004/0062359 A1 | 4/2004 | Jones et al. | |
| 2004/0088605 A1 | 5/2004 | Nakamoto et al. | |
| 2006/0168467 A1 * | 7/2006 | Couturier et al. ............... | 714/4 |

FOREIGN PATENT DOCUMENTS

WO WO 01/95561 A2 12/2001

* cited by examiner

*Primary Examiner*—David Ton
(74) *Attorney, Agent, or Firm*—Matthew D. Rabdau; Michael J. Fogarty, III

(57) ABSTRACT

A load testing apparatus and method has a display unit for the presentation of data that relate to a load test of a telecommunication network. The display includes a graphical user interface with the load test being divided into several test phases and on the graphical user interface functionalities being assigned to these test phases. The load testing apparatus further has a storage device into which user identifiers are enterable, and the functionalities are pooled into groups so that for each identifier there one or more groups of functionalities may be enabled.

9 Claims, 7 Drawing Sheets

LOAD TESTING OF A TELECOMMUNICATION NETWORK

BACKGROUND OF THE INVENTION

The present invention relates to testing of a telecommunication network, and more particularly to an apparatus and method of load testing where the load test is divided into several test phases with associated groups of functionalities.

There is a known load testing apparatus where all users are provided with the full scope of functions for the load test regardless of the previous knowledge of the user. This has often led to erroneous operations. Since some load tests run for weeks and even months, an inadvertent alteration of a load test parameter may not be detected, leading to an enormous loss of time and cost expenditure. To avoid this problem an extensive learning and training program has been presented to users. However this limits the circle of potential users, increases the lead time due to training requirements in the case of changes or supplements to the user interface and entails high expenditure of cost and time for the user learning and training programs.

What is desired is a load testing apparatus and method that reduces the scope of user learning and training efforts and, thus, reduces erroneous operations.

BRIEF SUMMARY OF THE INVENTION

Accordingly the present invention provides a load testing apparatus and method that has a display unit for the presentation of data that relates to a load test of a telecommunication network. The display has a graphical user interface. The load test is divided into several test phases and on the graphical user interface functionalities are assigned to these test phases. The load testing apparatus further has a storage device into which user identifiers are enterable, and the functionalities are pooled into groups so that for each identifier there is enabled one or more groups of functionalities.

The objects, advantages and other novel features of the present invention are apparent from the following detailed description when read in light of the drawing and appended claims.

DETAILED DESCRIPTION OF THE INVENTION

Figure 1:
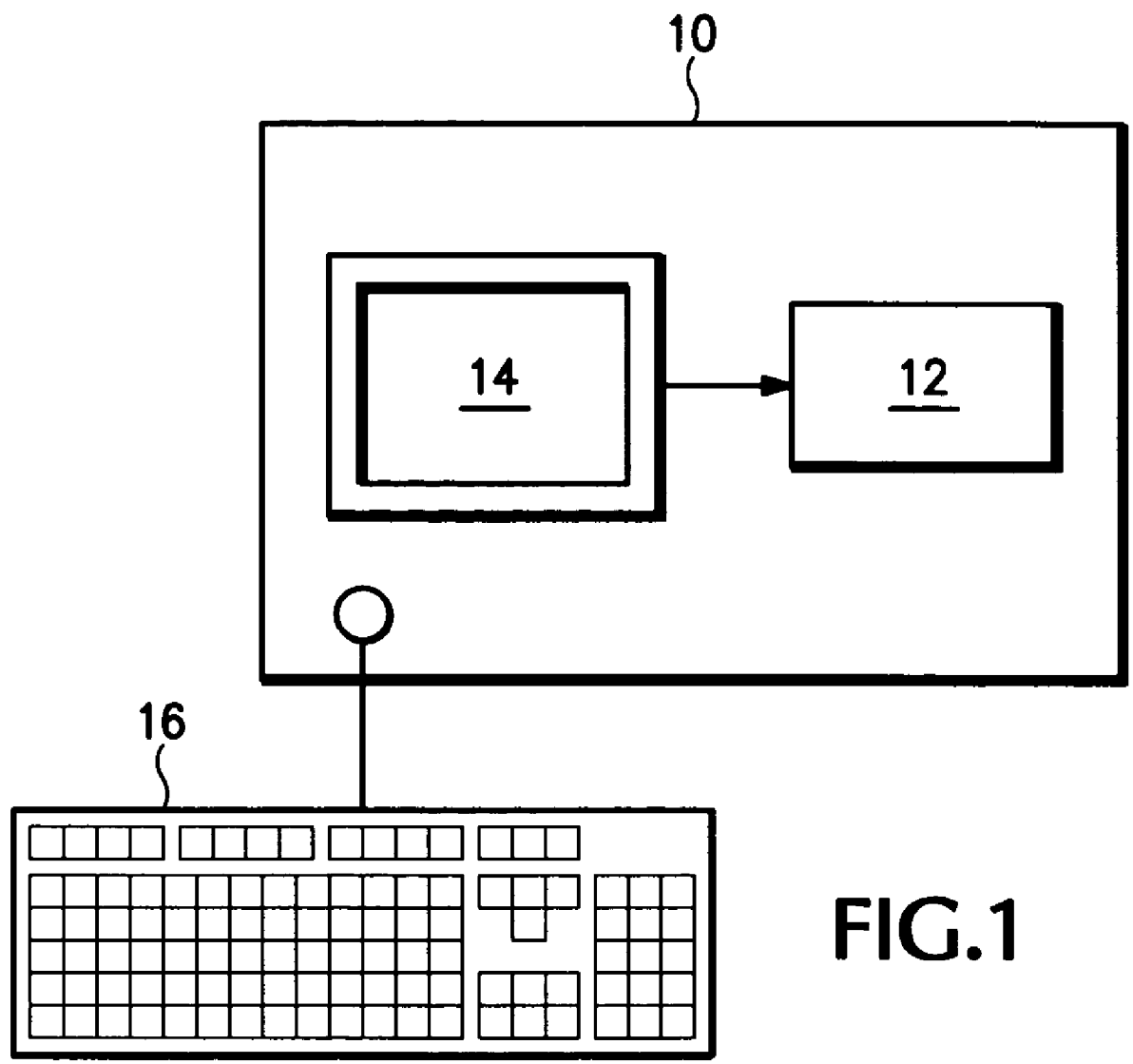
FIG. 1 is a schematic view of an embodiment of a load testing apparatus according to the present invention.

Within the scope of setting up a load test, different users are concerned with different tasks. Within these tasks with which they usually concern themselves, the users already have a good level of knowledge after a little learning and training effort. As a consequence of their work within the scope of these tasks they are proficient in these tasks, and erroneous operations are almost ruled out. Therefore the functionalities on a graphical user interface are divided into groups that are adapted to the areas of responsibility of different users, so for certain users only certain functionalities are enabled. Within the scope of a load test it is the following group divisions that are of particular importance for the functionalities of the graphical user interface—load test development, load test preparation, load test execution and load test analysis. A load test developer receives the test requirements and develops a test plan. The test plan describes how a device under test (DuT) is to be tested. A load test preparer takes care of the definition and the configuration of all test parameters, i.e., compiles a virtual representation of the network environment by defining interfaces, setting up protocol stacks, assigning load profiles, determining the type and number of subscribers, and arranging for specialities in the test such as the linking of different network standards. In comparison to the two aforementioned users, a lower level of knowledge is demanded from a load test executor. The load test executor executes the test in accordance with the test plan and monitors the test to ensure that it takes place as planned. If a problem occurs during the execution of the load test, the load test executor stops the test and informs the load test developer accordingly. Load tests are frequently executed locally, i.e., at a real telecommunications node, by an employee of the network operator. A load test analyzer analyzes the test result and ascertains if and why problems have occurred. Since an error report not only includes the mention of the problem but also the context in which the problem occurred, the load test analyzer can describe the error and pass this information on to the load test developer for elimination. The different users are only provided with the functionalities of which they have some knowledge and which they need with regard to their tasks. This way the learning and training effort is kept low, while at the same time the risk of erroneous operations is largely reduced. Thus, the operating manuals may be written in accordance with the groups of functionalities. Because of the specialization undertaken, the operating manual relevant to a particular user is compact, containing the information relevant to that user. This results in an increase in clarity and faster vocational adjustment. It is preferred that the group functionalities be assigned to different test phases. Since different users are responsible for different test phases, this results in usability of a load testing apparatus having a high level of ergonomics and economics.

In a preferred embodiment on the graphical user interface activation means are designed to activate a certain group of functionalities, if several functionalities have been enabled for a user. This takes account of the fact that, depending on the size of the team working on a load test, it is possible for several groups of functionalities to be assigned to a user in accordance with an identifier, because one user may be working as, for example, a load test developer and a load test preparer at the same time. The specialized graphical user interface results in a reduction of the danger of erroneous operations and an increase in clarity for these users. Above all, it enables the universal applicability of a load test at companies with a large and hence specialized workforce, and at companies with only a small workforce.

There may also be groups of functionalities that do not relate to test phases, particularly a group relating to administrator functionalities to allow the enabling of the groups of test phase functionalities for the user identifiers, and a group of customer test functionalities to allow the execution of load test functions outside the group of test phase functionalities. Especially for each group of functionalities there is a unique user interface. This increases clarity and simplifies usability even for well-trained users. Depending on the complexity of the load test, the same graphical user interface may be used for more than one group of functionalities. Also the tests phases succeed one another serially timewise.

Referring now to FIG. 1 a load testing apparatus 10 is shown with a display unit 12 for the presentation of data relating to a load test of a telecommunication network, the display unit including a graphical user interface. A load test is subdivided into several test phases and on the graphical user interface functionalities are assigned to each test phase. The load testing apparatus 10 further has a storage device 14 into which user identifiers and the enabling of certain functionalities are entered by an administrator, the functionalities being pooled in groups and for each identifier there being enabled one or more groups of functionalities. The enabling of certain groups of functionalities may be performed through corresponding entries via a keyboard, i.e., in a table, for certain identifiers according to certain users.

Figure 2:
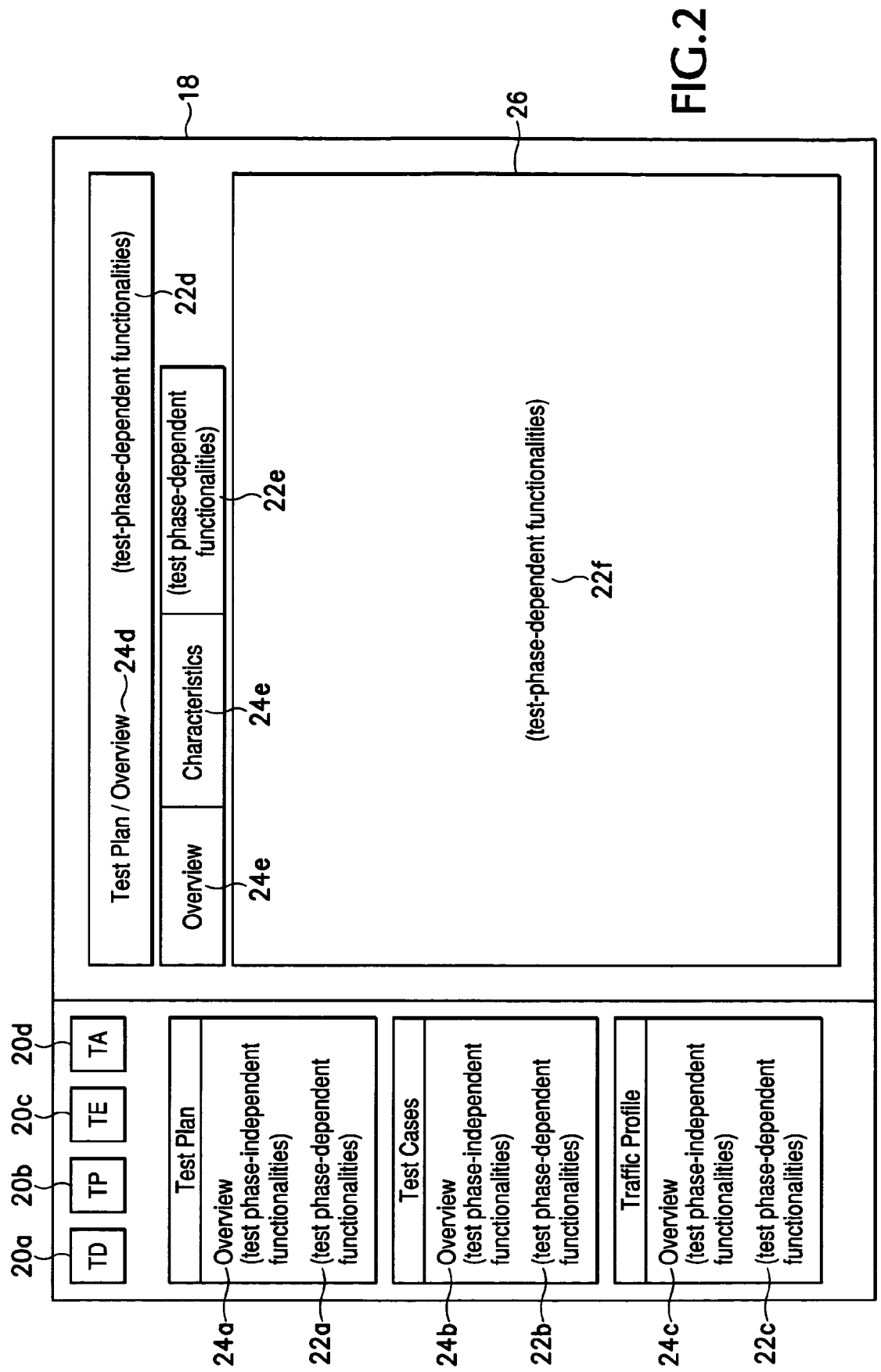
FIG. 2 is a plan view of an embodiment of a graphical user interface for the load testing apparatus according to the present invention.

FIG. 2 shows as an example a graphical user interface 18 as displayed on the display unit 12 of the load testing apparatus 10. The user interface 18 shows four higher-level functionalities 20a-d, each of which stands for a group of functionalities. For example, functionality 20a (TD) stands for load test development (Test Development), functionality 20b (TP) for load test preparation (Test Preparation), functionality 20c (TE) stands for load test execution (Test Execution) and functionality 20d (TA) stands for load test analysis (Test Analysis). When a user logs onto the load testing apparatus 10 during a login procedure using an identifier then, depending on which groups of functionalities the administrator has enabled for that identifier, one or several functionalities 20a-d are unlocked, i.e., they are activated and the user may click on them, for example by using a pointer device. For better recognizability functionalities 20a-d which are not unlocked are preferably displayed on the screen in a first color, the unlocked functionalities in a second color, and the functionality actually activated in a third color. Accordingly if only one group of functionalities is unlocked for a user, the user has no choice. If several groups of functionalities are unlocked for a user, the user may by means of the pointer device, such as a computer mouse, activate the group of functionalities desired for the particular test phase.

Following the activation of a functionality 20a-d, the representations in one or several windows of the graphical user interface 18 are modified accordingly. In the present example there are displayed in the relevant windows functionalities which belong to the selected group of functionalities. In FIG. 2 functionalities belonging to this group of functionalities are generally designated with the reference number 22. The appended letter indicates in which window this functionality is displayed. The user interface 18 may then only have functionalities that belong to the selected group of functionalities. It is, however, still possible, as is shown in FIG. 2, for functionalities to be displayed in specific or in all windows which are not assigned to any group of functionalities, but are rather placed over all groups of functionalities. In FIG. 2, the functionalities are generally designated with the reference number 24, again with a letter appended to designate the relevant window. In the present example an active window 26 itself is only left with functionalities that belong to the selected or assigned group of functionalities.

Figure 3A:
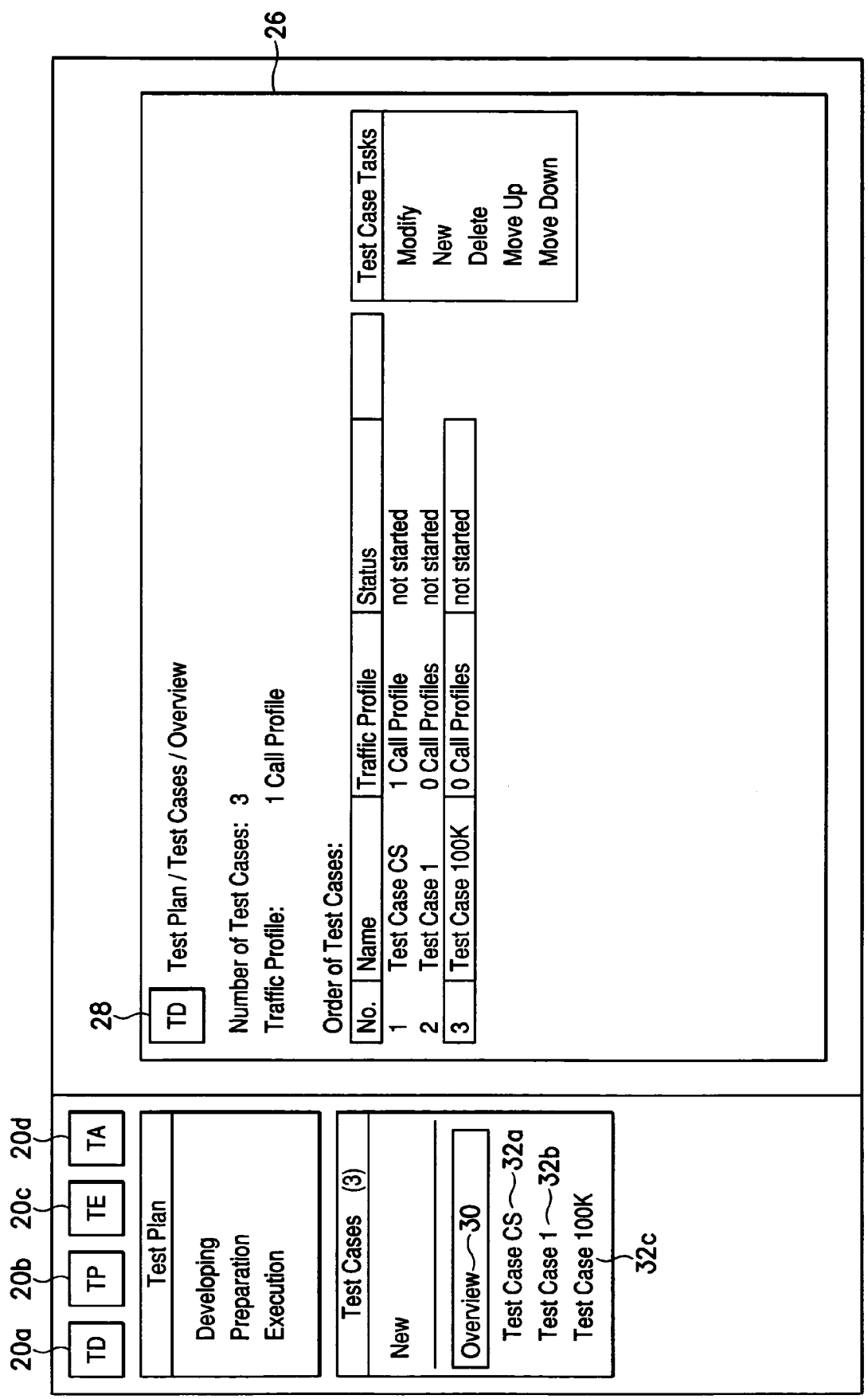
FIGS. 3a and 3b are plan views of different embodiments of the graphical user interface for a "load test development" phase for the load testing apparatus according to the present invention.
Figure 3B:
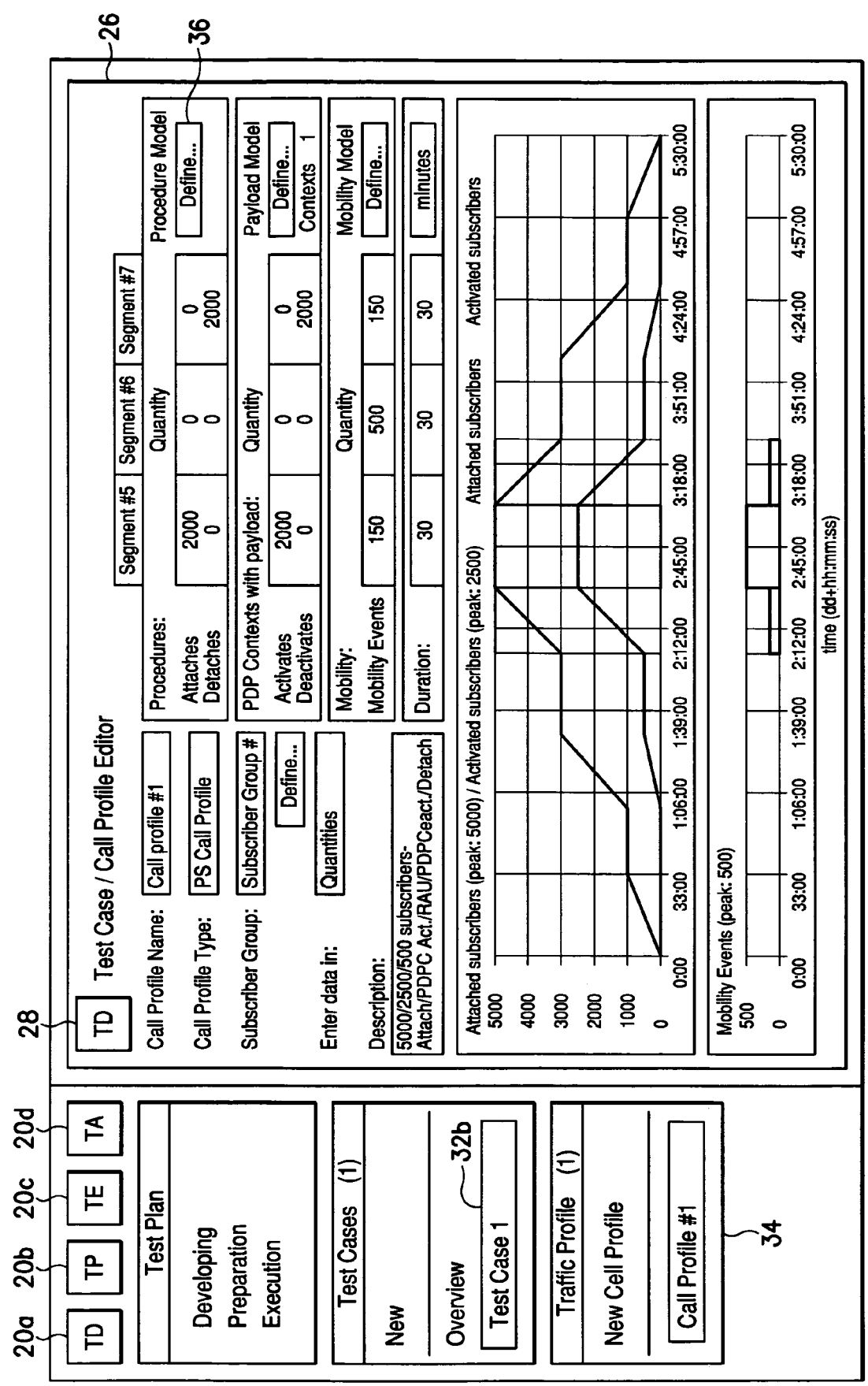

FIGS. 3a, 3b, 4, 5a and 5b show different graphical user interfaces 18 that may be implemented in the load testing apparatus 10. For example, FIG. 3a shows the graphical user interface 18 in which is seen all the functionalities 20a-d. In the present example, only functionality 20a is enabled for the user, as is seen from the color. In the active window 26 there are only functionalities assigned to the group of functionalities represented by functionality 20a. To facilitate orientation, functionality 20a is once again shown in the active window 26, see reference number 28. In the present example there is shown in the active window 26 an overview of different test cases. The overview representation is effected by the activation of an "Overview" functionality 30. By means of functionalities 32a, b, c there may now be defined certain test cases. FIG. 3b shows another view of the user interface 18 that in turn offers functionalities that belong to the group of functionalities represented by functionality 20a. In the present example functionality 32b is activated, i.e., the setting-up of the test case (1) is selected. According to this activation there are shown in window 34 further functionalities that result from the activation of functionality 32b and, of course, again belong to the group of functionalities activated by functionality 20a. According to the functionalities in window 34 there is selected in the present example a setting-up of a "New Call Profile", i.e., the profile of a new caller, especially the setting-up of the call profile having the number (1). The functionalities shown in the active window 26 now relate to functionalities that are required for setting up call profile (1). Through functionalities envisaged in the active window 26, such as functionality 36, there may be initiated the display of a lower-level graphical user interface for entering further definitions.

Figure 4:
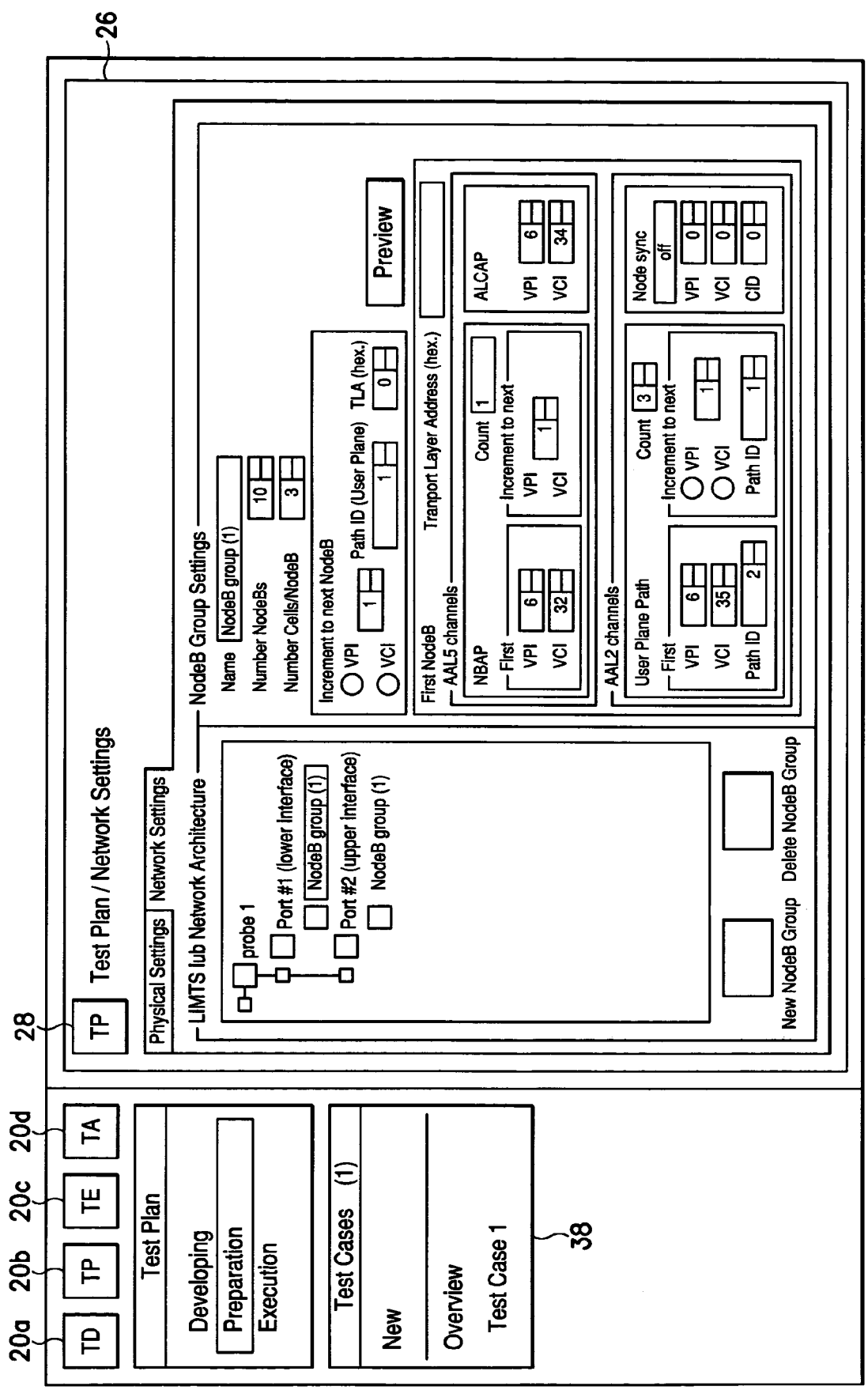
FIG. 4 is yet another plan view of the graphical user interface for a "load test preparation" test phase for the load testing apparatus according to the present invention.

FIG. 4 shows the graphical user interface 18 when there have been enabled for the user the group of functionalities represented by functionality 20b. In the present example there are shown in active window 26 functionalities that serve load test preparation. In window 38 it is defined that this is the load test preparation relating to test case (1).

Figure 5A:
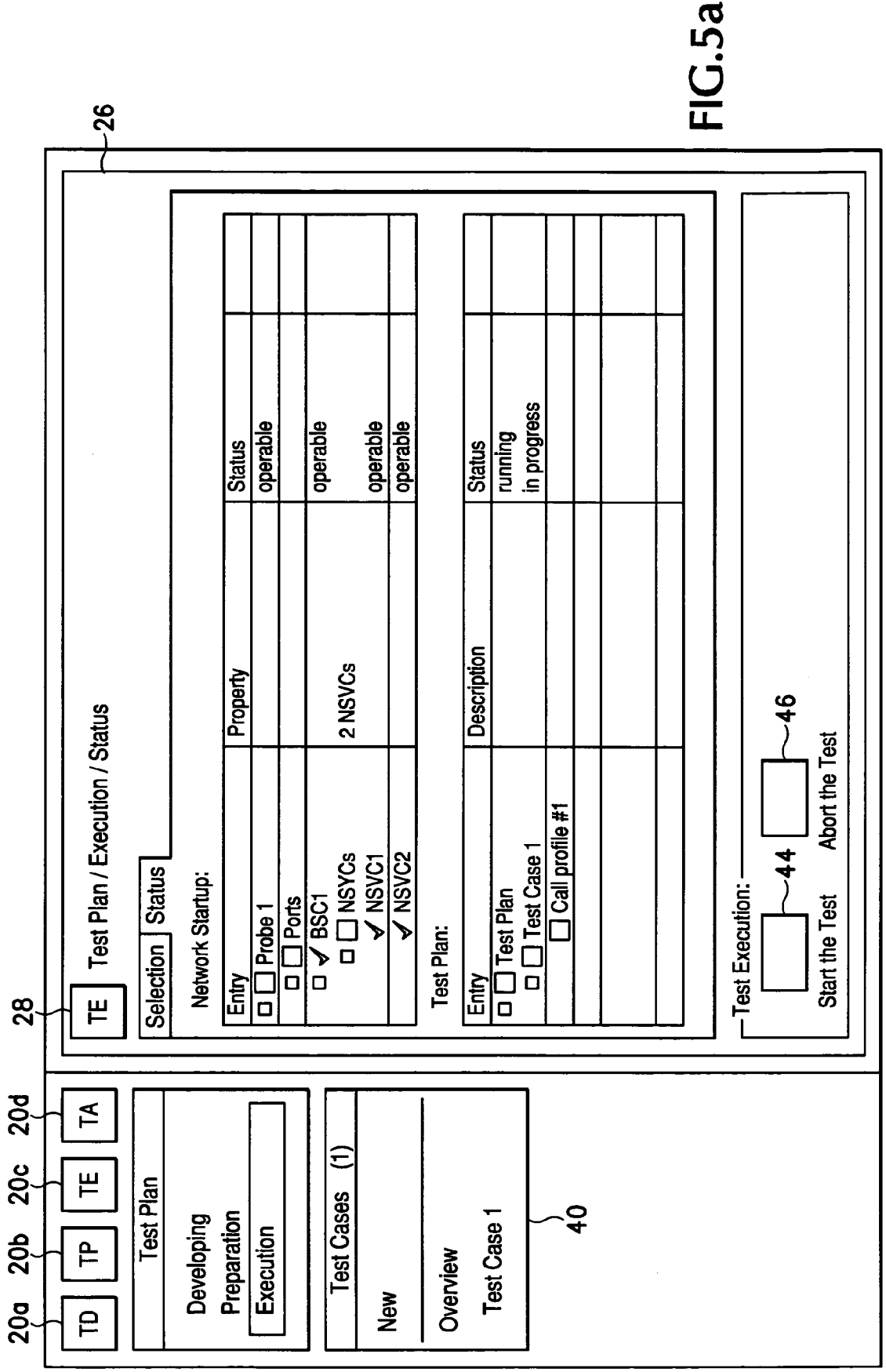
FIGS. 5a and 5b are plan views of further embodiments of the graphical user interface for a "load test execution" test phase for the load testing apparatus according to the present invention.
Figure 5B:
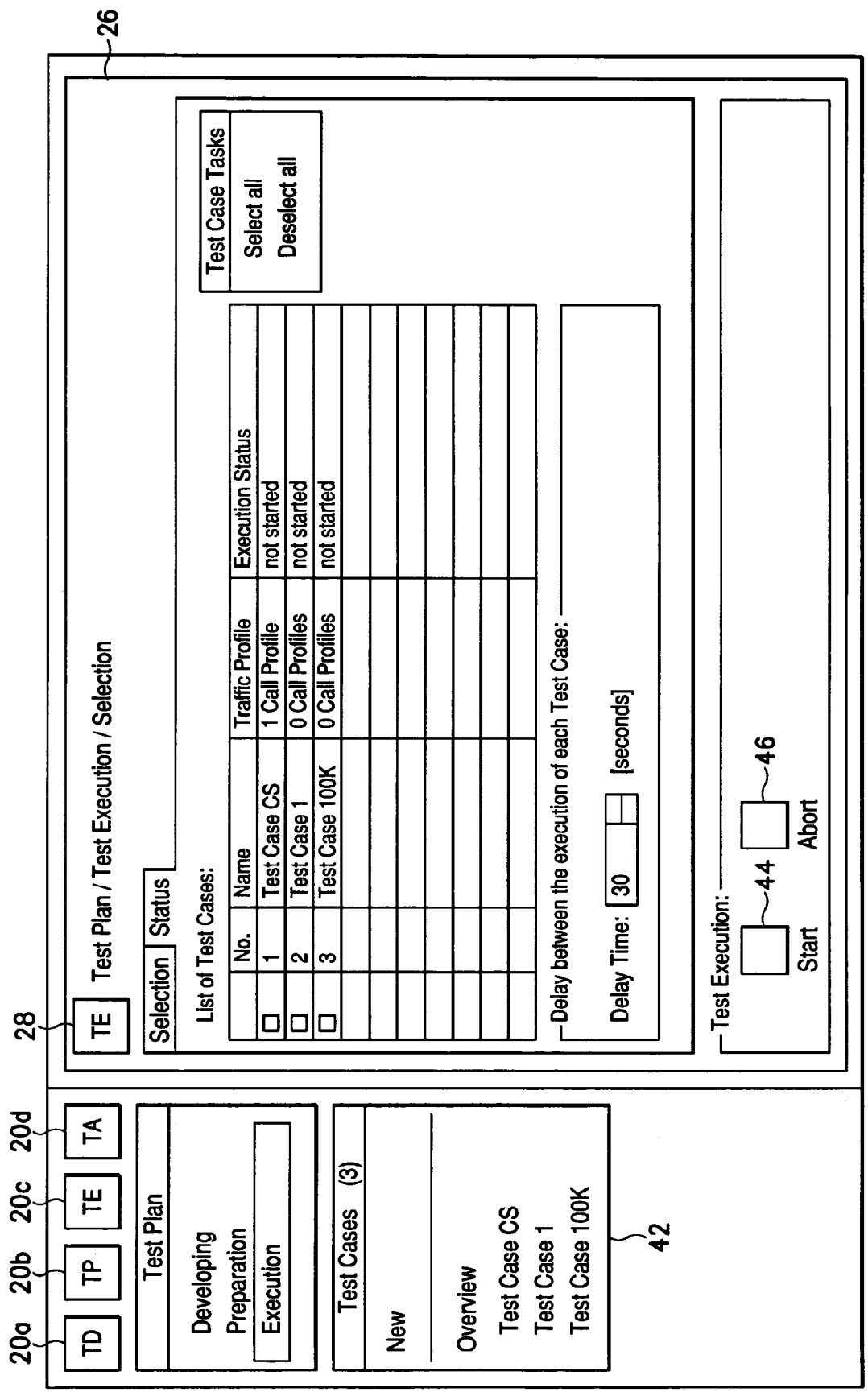

The graphical user interfaces 18 shown in FIGS. 5a and 5b relate to the load test execution, i.e., in each case functionality 20c is activated, and the associated group of functionalities is enabled. While in window 40 of FIG. 5a it is test case (1) that is activated, the serial execution of three test cases is activated in window 42 of FIG. 5b. In active window 26 there are specified in each case functionalities that correspond to the activated functionality 20c and especially to the selection in windows 40 and 42, respectively. A start of the load test may in each case be effected through functionality 44, and an abortion of the load test may in each case be effected through functionality 46.

Of course, the principle shown using the example of FIGS. 2 to 5 also applies to the group of functionalities that may be activated by functionality 20d, and which are assigned to the load test analysis. Not shown are the graphical user interfaces 18 mentioned above that do not relate to load test phases, but rather to administrator functionalities that allow the enabling of the groups of test phase functionalities for the user identifiers and to customer test functionalities that allow the execution of load test functions outside the group of test phase functionalities.

Instead of the different colors mentioned above, there may be used different levels of brightness of a color or, for monochrome representations, different shades of grey.

Thus the present invention provides a load testing apparatus and method that divides the load test process into test phases and associates only functionalities related to a particular one of the test phases on a graphical user interface, which reduces learning and training of users who are involved only with specific ones of the test phases.

What is claimed is:

1. An improved load testing apparatus of the type having a display unit for the presentation of data that relates to a load test of a telecommunication network which involves the use of a graphical user interface, the load test being divided into a plurality of test phases with functionalities assigned to each test phase, the improvement comprising a storage device having an enterable identifier for a user and in which the functionalities are pooled into groups so that for each enterable identifier there is enabled a group of the functionalities.

2. The load testing apparatus according to claim 1 wherein each group of functionalities is assigned to a different one of the test phases.

3. The load testing apparatus according to claim 1 wherein the graphical user interface comprises activation means designed to activate a certain group of the functionalities when more than one group of functionalities are enabled by the enterable identifier.

4. The load testing apparatus according to claim 1 wherein the groups of functionalities are assigned to the test phase selected from the group consisting of load test development, load test preparation, load test execution and load test analysis.

5. The load testing apparatus according to claim 1 further comprising groups of functionalities that are not related to test phases wherein the further groups are selected from the group consisting of a group relating to administrator functionalities to allow the enabling of the groups of test phase functionalities for the enterable identifiers and a group of customer test functionalities to allow the execution of load test functions outside the group of test phase functionalities.

6. The load testing apparatus according to claim 1 wherein each group of functionalities comprises a unique graphical user interface.

7. The load testing apparatus according to claim 1 wherein the graphical interface accommodates more than one group of functionalities.

8. The load testing apparatus according to claim 1 wherein the test phases comprise test phases that succeed one another serially timewise.

9. A method for load testing a telecommunication network with a load testing apparatus that has a display unit with a graphical user interface for the presentation of data relating to a load test of the telecommunication network, the load test being divided into a plurality of test phases and on the graphical user interface functionalities being assigned to the test phases comprising the steps of:
   a) dividing the functionalities into groups; and
   b) for a certain user enabling at least one of the groups of functionalities, the at least one group of functionalities selected based upon an identifier for the certain user, the functionalities pooled into groups.

* * * * *